United States Patent
Pendray et al.

(10) Patent No.: US 7,123,447 B2
(45) Date of Patent: Oct. 17, 2006

(54) PATTERNED MULTI-MATERIAL BASECOAT TO REDUCE THERMAL PROTRUSION

(75) Inventors: John R. Pendray, Edina, MN (US); Ladislav Pust, Savage, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 28 days.

(21) Appl. No.: 10/462,277

(22) Filed: Jun. 16, 2003

(65) Prior Publication Data
US 2004/0252412 A1 Dec. 16, 2004

(51) Int. Cl.
*G11B 5/60* (2006.01)

(52) U.S. Cl. .................................. 360/234.7

(58) Field of Classification Search ............ 360/234.7, 360/235.1, 236.5, 317, 126
See application file for complete search history.

(56) References Cited

U.S. PATENT DOCUMENTS

| | | | |
|---|---|---|---|
| 5,774,975 A | 7/1998 | Maffitt et al. | |
| 5,909,340 A * | 6/1999 | Lairson et al. | 360/237.1 |
| 5,949,627 A | 9/1999 | Williams et al. | |
| 6,252,741 B1 | 6/2001 | Ahn | |
| 6,366,428 B1 | 4/2002 | Yamanaka et al. | |
| 6,381,094 B1 * | 4/2002 | Gill | 360/126 |
| 6,623,652 B1 * | 9/2003 | Hsiao et al. | 216/22 |
| 6,661,605 B1 * | 12/2003 | Pust et al. | 360/126 |
| 6,687,083 B1 * | 2/2004 | Hsiao et al. | 360/126 |
| 6,737,281 B1 * | 5/2004 | Dang et al. | 438/3 |
| 6,747,841 B1 * | 6/2004 | Olim et al. | 360/126 |
| 6,751,055 B1 * | 6/2004 | Alfoqaha et al. | 360/126 |
| 6,842,308 B1 * | 1/2005 | Pust et al. | 360/234.7 |
| 6,894,871 B1 * | 5/2005 | Alfoqaha et al. | 360/126 |
| 2002/0075600 A1 | 6/2002 | Schnur et al. | |

OTHER PUBLICATIONS

U.S. Appl. No. 10/352,744, filed Jan. 28, 2003, Jou et al.
U.S. Appl. No. 10/383,298, filed Mar. 7, 2003, Macken et al.

* cited by examiner

*Primary Examiner*—Angel Castro
(74) *Attorney, Agent, or Firm*—Kinney & Lange, P.A.

(57) ABSTRACT

To reduce thermal pole-tip protrusion and recession, a magnetic head includes a multi-material basecoat. The magnetic head has an air bearing surface and a back surface opposite the air bearing surface. The magnetic head includes a substrate and the basecoat positioned upon the substrate. The basecoat has a first portion and a second portion wherein a Young's modulus of the first portion is less than a Young's modulus of the second portion. A data transducer is positioned upon the basecoat adjacent the air bearing surface.

24 Claims, 6 Drawing Sheets

PATTERNED MULTI-MATERIAL BASECOAT TO REDUCE THERMAL PROTRUSION

CROSS-REFERENCE TO RELATED APPLICATION(S)

None.

BACKGROUND OF THE INVENTION

The present invention relates generally to the field of magnetic data storage and retrieval systems. In particular, the present invention relates to a thin film transducing head having improved performance due to reduced thermal pole tip protrusion and recession.

In a magnetic data storage and retrieval system, a thin-film transducing head typically includes a transducer, a substrate upon which the transducer is built, and an overcoat deposited over the transducer. The transducing head often times includes a basecoat, which forms an interface layer between the substrate and the transducer and is generally formed of an insulating material. The transducer, which typically includes a writer portion for recording and storing magnetically-encoded information on a magnetic media and a reader portion for retrieving that magnetically-encoded information from the magnetic media, is formed of multiple patterned layers successively stacked upon the basecoat. The volume of the transducer is typically much smaller than both the volume of the substrate and the volume of the overcoat.

The layers of the transducer, which include both metallic and insulating layers, all have differing mechanical and chemical properties than the substrate. These differences in properties affect several aspects of the transducer. First, the layers of the transducing head will be lapped at different rates. Thus, when an air bearing surface (ABS) of the transducing head is lapped during its fabrication, differing amounts of the layers will be removed, resulting in the transducing head having an uneven ABS. Commonly, a greater amount of the metallic layers of the transducer will be removed during the lapping process than will be removed from the substrate. Thus, the lapping process results in a pole tip recession (PTR) of the metallic layers of the transducer with respect to the substrate. The PTR of a particular layer is defined as the distance between the air bearing surface of the substrate and the air bearing surface of that layer.

The differing mechanical and chemical properties of the substrate and transducer layers affect the air bearing surface during operation of the transducing head. As the magnetic data storage and retrieval system is operated, the transducing head is subjected to increased temperatures within the magnetic data storage and retrieval system. In addition, a temperature of the transducing head itself, or a part thereof, may be significantly higher than the temperature within the magnetic data storage and retrieval system due to heat dissipation caused by electrical currents in the transducer.

The coefficient of thermal expansion (CTE) of materials used in forming the substrate is typically much smaller than the CTE of materials used in forming the metallic layers of the transducer. Due to the large CTE of the transducer's metallic layers, those layers tend to expand a greater amount in response to high temperatures than will the substrate. Thus, when the transducing head is subjected to high operating temperatures, the metallic layers tend to protrude closer to the magnetic disc than the substrate; thereby affecting the PTR of the transducer. This change in PTR caused by temperature is referred to as the thermal protrusion.

During operation of the magnetic data storage and retrieval system, the transducing head is positioned in close proximity to the magnetic media. The distance between the transducer and the media is preferably small enough to allow for writing to and reading from the magnetic media with a large areal density, and great enough to prevent contact between the magnetic media and the transducing head. Performance of the transducer depends primarily on this distance between the media and the transducing head. To keep the distance between the transducing head and the magnetic media constant, PTR should not change significantly with temperature. If thermal protrusion is large, then the spacing between the transducer and the media will change significantly with temperature, thereby requiring the low-temperature fly height be enough to accommodate the higher operating temperatures. On the other hand, if thermal protrusion is close to zero, the low-temperature fly height can be reduced.

As areal density of the magnetic media increases, the requirements for transducing head fly height become such that thermal protrusion takes up a significant portion of the head disc spacing. The mismatched CTE between the materials of the transducing head, in particular the transducer, and the material of the substrate give rise to thermal protrusion. One method to reduce thermal protrusion is to introduce materials forming the transducer and/or materials near the transducer that have low coefficients of thermal expansion (GTE) to reduce or constrain the expansion of the transducer metals. However, constraining layers increases the stresses on the transducer structure and may also increase waviness of the ABS. Another method to reduce the thermal protrusion effect includes changing the reference surface for the air bearing surface to a material that expands and contracts with the transducer materials. However, changing reference surfaces is complex and may have negative impacts on other aspects of the disc drive system.

The present invention is a transducing head structure that reduces thermal protrusion when the transducing head is operated at high temperatures, but does not increase waviness of the ABS, have a negative impact on other aspects of the disc drive system, or over constrain the materials of the transducing head.

BRIEF SUMMARY OF THE INVENTION

The present invention relates to a magnetic head having an air bearing surface and back surface opposite the air bearing surface. The magnetic head includes a substrate and a basecoat positioned upon the substrate. The basecoat has a first portion and a second portion wherein a Young's modulus of the first portion is less than a Young's modulus of the second portion. The basecoat includes multiple materials and reduces thermal pole-tip recession in the magnetic head with respect to the air bearing surface. A data transducer is positioned upon the basecoat adjacent the air bearing surface. The second portion of the basecoat, which is more rigid than the first portion, may be positioned adjacent the air bearing surface, adjacent the back surface, or anywhere between the air bearing surface and the back surface.

DETAILED DESCRIPTION

Figure 1A:
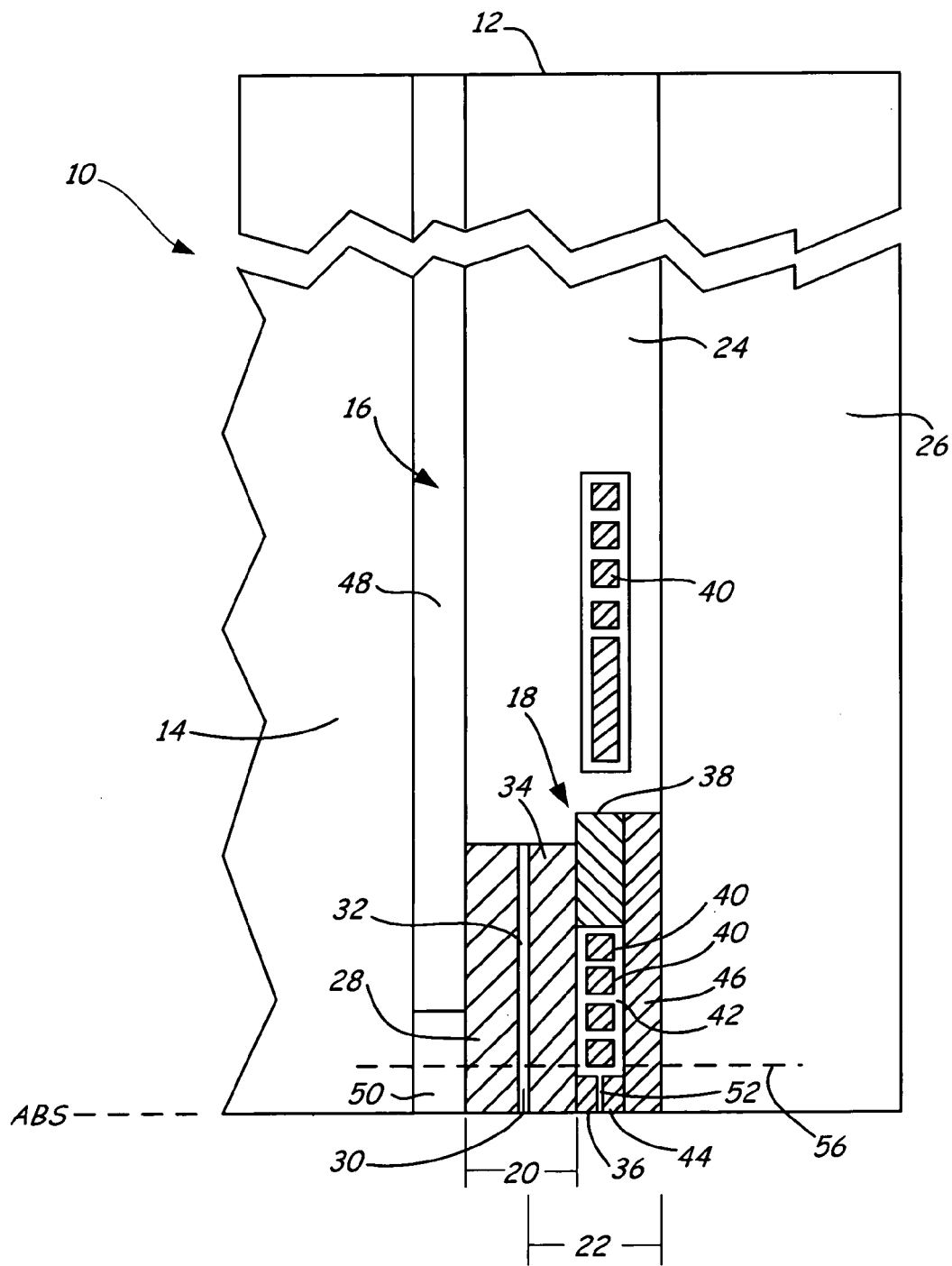
FIG. 1A is a partial cross-sectional view of a transducing head in accord with the present invention.
Figure 1B:
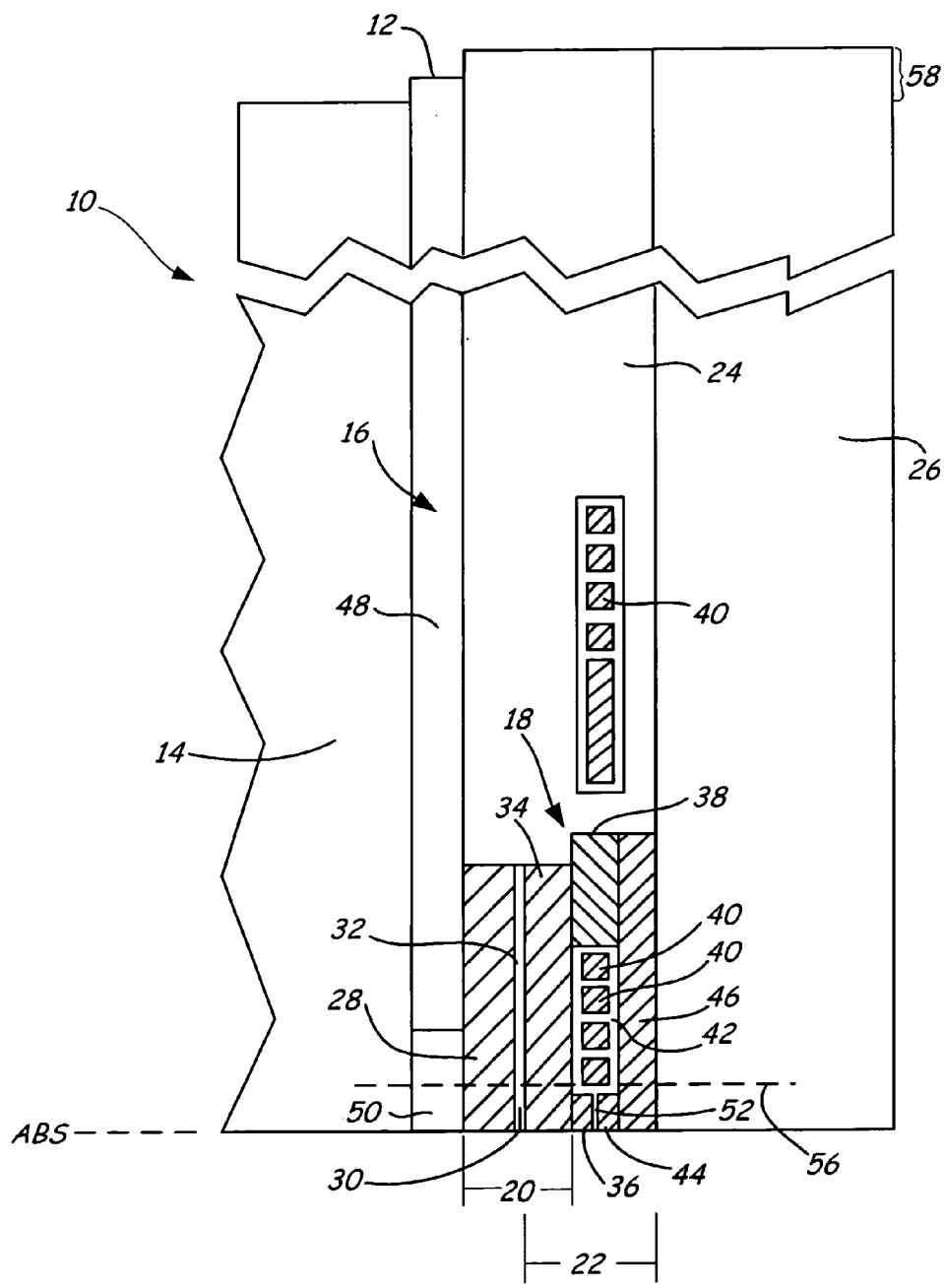
FIG. 1B is a partial cross-sectional view of the transducing head of FIG. 1A showing the effect of an expanding transducer.

FIGS. 1A and 1B are partial cross-sectional views of a transducing head 10 in accord with the present invention, with FIG. 1B showing the effect of an expanding transducer. The cross-sections are taken substantially normal to an air bearing surface (ABS) of transducing head 10. A back surface 12, or back side of transducing head 10, is opposite and substantially parallel to the ABS.

Transducing head 10 includes a substrate 14, a multi-material basecoat 16, a transducer 18 (comprised of a reader 20 and a writer 22), an insulating layer 24 and an overcoat 26. Reader 20 includes a bottom shield 28, a read element 30, a read gap 32, and a shared pole 34. Writer 22 includes shared pole 34, a bottom pole tip 36, back via 38, conductive coil 40, coil insulator 42, a top pole tip 44, and a top pole 46. Transducing head 10 is a merged-head configuration in which shared pole 34 serves as a top shield for reader 20 and a bottom pole for writer 22. Transducing head 10 may also be arranged in a piggy back configuration in which the top shield of the reader and the bottom pole of the writer are made of separate layers (not shown), or in a merged-head configuration in which the reader is built upon the writer (not shown).

Basecoat 16 is typically patterned or deposited on substrate 14, and provides an interface layer, which is generally insulating, between substrate 14 and insulating layer 24. Basecoat 16 is multi-material and includes a compliant portion 48 and a rigid portion 50, with rigid portion 50 positioned adjacent the ABS of transducing head 10. Compliant portion 48 and rigid portion 50 are positioned in-planed with each other. Reader 20 and writer 22 are each multilayered devices that are stacked upon basecoat 16 adjacent the ABS of transducing head 10. Reader 20 is formed on basecoat 16, and writer 22 is both stacked on and merged with reader 20. Co-planarly positioned with the layers of reader 20 and the writer 22, and opposite the ABS of transducing head 10, is insulating layer 24. Overcoat 26 is formed on writer 22 and on insulating layer 24.

Substrate 14 is typically formed of an electrically-conductive, ceramic material such as AlTiC. Other material options for the substrate include TiC, Si, SiC, $Al_2O_3$, or other composite materials formed of combinations of these materials. Of these materials, AlTiC and TiC have coefficients of thermal expansion (CTE), typically in the range of about $6.0 \times 10^{-6}/°$ C. to about $9.0 \times 10^{-6}/°$ C., while silicon has a lower CTE, in the range of about $2.3 \times 10^{6}/°$ C. to about $2.4 \times 10^{6}/°$ C.

Basecoat 16 is formed upon substrate 14 and includes the first compliant portion 48 and the second, rigid portion 50, which is more rigid than compliant portion 48. Compliant portion 48 of basecoat 16 is generally formed of $SiO_x$ and $SiO_xN_y$, or alternatively may be formed by an air gap. One method of forming the air gap includes placing a sacrificial layer (e.g., Ge) during wafer build and then removing that material when exposed during slider processing (e.g., $H_2O_2$ etch). Another method for forming the air gap includes depositing a compliant layer (e.g., photoresist) to create the gap. The Young's modulus of the material of compliant portion 48 is typically low and is in the range of about 30 GPa to about 90 GPa, and most preferably in the range of about 50 GPa to about 60 GPa. Rigid portion 50 of basecoat 16 is generally formed of alumina ($Al_2O_3$), SiC, or a diamond like carbon (DLC). The material of rigid portion 50 has a Young's modulus, which is greater than the Young's modulus of compliant portion 48, which is typically in the range of about 150 GPa to about 1000 GPa. In the embodiment shown in FIGS. 1A and 1B, rigid portion 50 has a height in the range of about 0.5 microns to about 5 microns, although further embodiments may have a height greater than 5 microns. Compliant portion 48 is spaced away from the ABS and extends from rigid portion 50 to back surface 12 of the transducing head 10.

Reader 20 is formed on basecoat 16 and includes bottom shield 28, read element 30, read gap 32, and shared pole 34. Read gap 32 is defined on the ABS between terminating ends of bottom shield 28 and shared pole 34. Read element 30 is positioned in read gap 32 adjacent the ABS. Read gap 32 insulates read element 30 from bottom shield 28 and shared pole 34. Read element 30 may be any variety of different types of read elements, such as an anisotropic magnetoresistive (MR) read element or a giant magnetoresistive (GMR) read element. In operation, a magnetic flux from a surface of the magnetic media causes rotation of a magnetization vector of MR read element, which in turn causes a change in electrical resistivity of MR read element. The change in resistivity of read element 30 can be detected by passing a current through read element 30 and measuring a voltage across read element 30.

Writer 22 is formed on reader 20, and includes shared pole 34, bottom pole tip 36, back via 38, conductive coil 40, coil insulator 42, top pole tip 44, and top pole 46. Bottom pole tip 36 and back via 38 are formed on shared pole 34, with bottom pole tip 36 being positioned adjacent the ABS and back via 38 being spaced away from the ABS. A write gap 52 is defined on the ABS between bottom pole tip 36 and top pole tip 44. Top pole 46 is formed over top pole tip 44 and extends from the ABS to back via 38. Conductive coil 40 is positioned in coil insulator 42 between shared pole 34 and top pole 46, wrapping around back via 38 such that the flow of electrical current through conductive coil 40 generates a magnetic field across write gap 52. Further embodiments of the transducing head may include readers and/or writers having fewer or more metallic layers, and metallic layers spaced differently with respect to each other or the ABS.

Each of bottom shield 28, shared pole 34, bottom pole tip 36, back via 38, top pole tip 44, and top pole 46 are formed of metallic materials. Preferably, each of these components is formed of an alloy primarily composed of Fe and Ni, or Fe, Ni, and Co. Such metallic alloys typically have large CTEs, and in particular CTEs greater than the CTE of substrate 14 and basecoat 16. For example, Permalloy, a composition with about 80% Ni-20% Fe or 79% Ni-21% Fe has a CTE in the range of about $10.0 \times 10^{-6}/°$ C. to about $13.0 \times 10^{-6}/°$ C.

Read gap 32 is generally formed of an insulating material, such as $Al_2O_3$ or silicon nitride. Coil 40 is generally formed of an electrically conductive metal, such as copper, gold, or silver. Most commonly used is copper, which has a CTE in the range of about $16.0 \times 10^{-6}/°$ C. to about $18.0 \times 10^{-6}/°$ C. Coil insulator 42 is generally formed from a cured photoresist having a large CTE, or from other insulating materials, such as $Al_2O_3$, AlN, $SiO_2$, or $Si_3N_4$.

Not shown in FIGS. 1A and 1B are electrical leads and contacts to the read element and the coil. The electric leads and contacts are generally formed of metals, such as copper, tantalum, gold, or other metallic elements and alloys.

Insulating layer 24 is positioned in-plane with layers of reader 20 and writer 22 of transducing head 10, opposite from and recessed from the ABS. Overcoat 26 is formed over writer 22 and insulating layer 24. Both insulating layer 24 and overcoat 26 are typically formed of an insulating material, such as alumina oxides, alumina nitrides, silicon oxides, silicon nitrides, and silicon oxide nitrides.

The layers of transducing head 10 all have differing mechanical and chemical properties. Due to these different properties, the layers of transducing head 10 will be lapped at different rates. Thus, the lapping of the ABS of transducing head 10 during fabrication results in transducing head 10 having an uneven ABS. Commonly, a greater amount of the metallic layers of transducing head 10 will be removed during the lapping process than will be removed from substrate 14, resulting in a pole tip recession (PTR) of the metallic layers with respect to substrate 14. The PTR of a particular layer is defined as the distance perpendicular to the ABS between the ABS of substrate 14 and the ABS of that layer.

The differing mechanical and chemical properties of the layers of transducing head 10 further affect the ABS of transducing head 10 during operation. The CTE of material used in forming substrate 14 is typically much smaller than the CTE of materials used in forming the metallic layers of transducer 18. Due to the larger CTE of the metallic layers, those layers tend to expand a greater amount than substrate 14. Thus, when transducing head 10 is subjected to high operating temperatures, the metallic layers protrude closer to the magnetic disc than substrate 14, thereby affecting the PTR of the metallic layers of transducing head 10. This change in PTR caused by the temperature is referred to as thermal protrusion.

During the operation of a disc drive system, the spacing between transducing head 10, in particular transducer 18, and the disc media is of critical importance. The spacing changes with temperature (thermal protrusion) due to a mismatch of CTEs between substrate 14 and the transducer materials. The metallic transducing layers, made mostly from high thermal expanding metals, are separated from the mechanically strong substrate (typically AlTiC) by basecoat interface layer 16. In current transducing heads, the basecoat is typically formed by a sheet alumina film. Thermal protrusion of the transducing head is given by interplay between the more expanding transducer metal layers, the basecoat and the substrate. Significant thermal protrusion of the transducing head occurs in both the direction towards the ABS and from the ABS.

The present invention addresses the problem of thermal protrusion by using a multi-material basecoat interface layer. The basecoat includes two materials, one compliant and one rigid, and at least two distinct portions, one formed from a compliant material and one formed from a rigid material. Compliant portion 48 of basecoat 16 has a Young's modulus less than the Young's modulus of rigid portion 50, and is thus more compliant than rigid portion 50. In the transducing head embodiment shown in FIGS. 1A and 1B, rigid portion 50 of basecoat 16 is positioned adjacent the ABS. Preferably, rigid portion 50 is as near the ABS as possible, (e.g., within at least 2 microns of the ABS). Compliant portion 48 of basecoat 16 is spaced away from the ABS. In prior art embodiments where the basecoat is comprised of a single material, a center of thermal expansion (i.e., neutral axis) is located along a center line of transducing head 10, which is typically between coil 40 and back surface 12. In the transducing head embodiment shown in FIGS. 1A and 1B, the center of thermal expansion shifts closer to the ABS and is located along a center line 56 of rigid portion 50 of basecoat 16.

During operation of transducing head 10, the metallic layers of transducer 18 expand with temperature at the same rate as prior art transducers, however, the expansion is in the direction away from the ABS and toward back surface 12 of transducing head 10 (as shown in FIG. 1B). Rigid portion 50 anchors, or mechanically attaches, transducer 18 at the ABS to substrate 14, and transducer 18 is more free to move away from the ABS. Compliant portion 48 permits expansion of transducer 18 and insulating layer 24 away from the ABS such that the expanding transducer is more attached to substrate 14 close to the ABS and has more freedom to move in the direction away from the ABS (i.e. towards back surface 12). The majority of transducer 18 expands towards back surface 12 of transducing head 10 and a smaller portion expands towards the ABS, as defined by center of thermal expansion 56. Thus, the thermal protrusion of transducer 18 relative to the ABS is reduced. The more compliant compliant portion 48 of basecoat 16 is with respect to rigid portion 50, the more pronounced the effect of rigid portion 50.

Figure 2A:
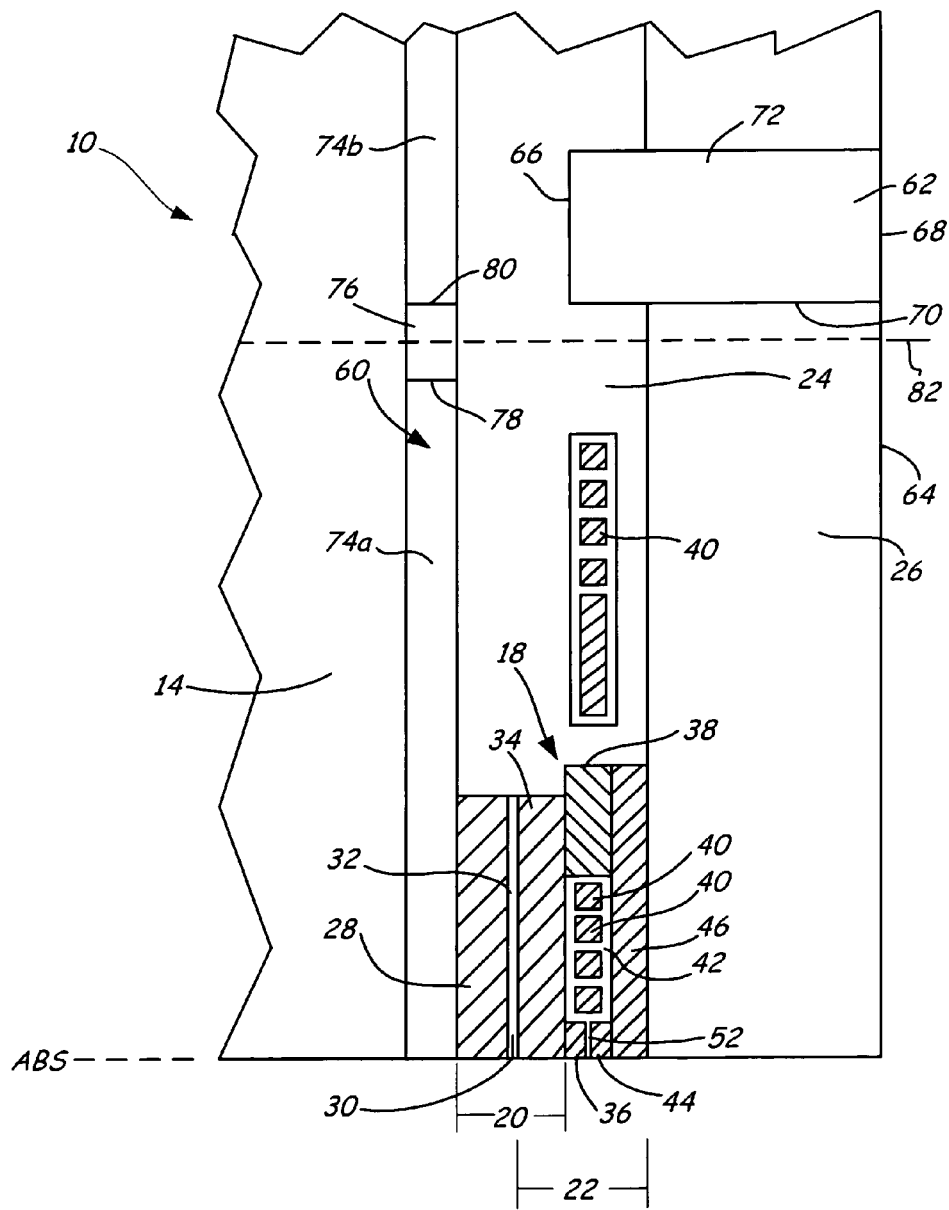
FIG. 2A is as a partial cross-sectional view of a further embodiment of the transducing head in accord with the present invention.
Figure 2B:
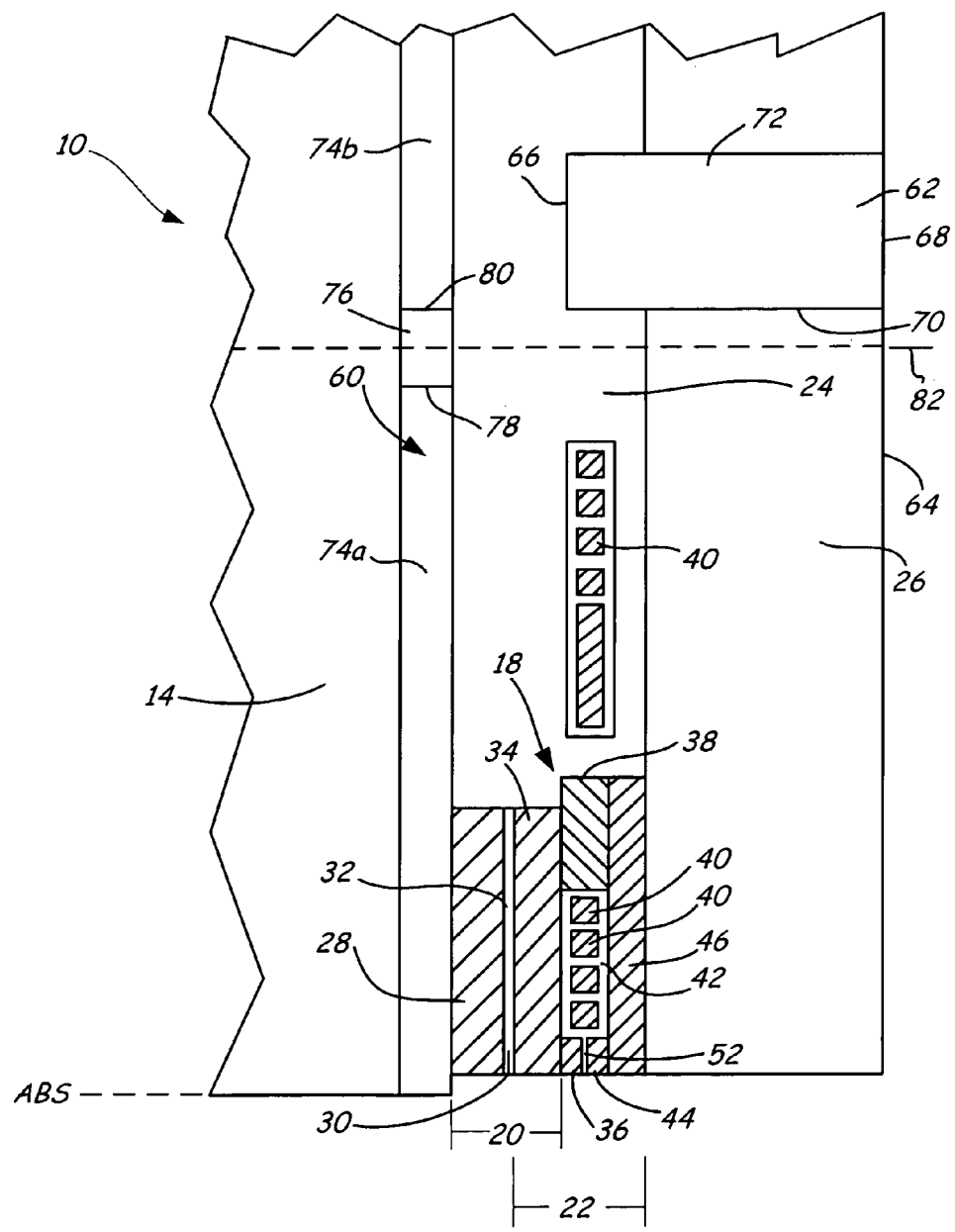
FIG. 2B is a partial cross-sectional view of a transducing head of FIG. 2A showing the effect of an expanding transducer.

FIG. 2A is a partial cross-sectional view of transducing head 10 in accord with another embodiment of the present invention and FIG. 2B is a partial cross-sectional view of transducing head 10 of FIG. 2A illustrating the expanding transducer 18. The cross-sections are taken substantially normal to the ABS of the transducing head. The transducing head includes substrate 14, a multi-material basecoat 60, transducer reader 20, transducer writer 22, insulating layer 24, an electrical stud 62 and overcoat 26.

Electrical reader or writer stud 62 is formed in insulating layer 24 and overcoat 26, and carries a current from outside transducing head 10 to transducer 18. Stud 62 extends from insulating layer 24 to a trailing edge 64 of transducing head 10 (at overcoat 26), and has a first end 66 and a second end 68. First end 66 includes an electrical contact between reader 20 or writer 22 of transducer 18 and second end 68 makes an electrical contact with an external electrical lead (not shown). Stud 62 is typically located between the back surface of the transducing head (not shown in FIGS. 2A and 2B) and a center line of the transducing head (which is typically between coil 40 and the back surface). Stud 62 also includes a first edge 70 and a second edge 72 further from the ABS than first edge 70.

Basecoat 60 is a multi-material interface layer patterned on substrate 14. Basecoat 60 includes a compliant portion 74 (indicated by 74a and 74b) and a rigid portion 76, rigid portion 76 positioned away from the ABS. In particular, rigid portion 76 is recessed from the ABS, positioned much closer to the ABS than stud 62. However, in further embodiments of the basecoat, only first edge 78 may be closer to the ABS than first edge 70 of stud 62. The remaining portions of basecoat layer 60 are formed by compliant portions 74a and 74b. Transducing head 10 has a height in the range of about 200 microns to about 300 microns and rigid portion 76 includes a first edge 78 and a second edge 80, and preferably first edge 78 and second edge 80 of rigid portion 76 are closer to the ABS than first edge 70 of stud 62. Rigid portion 76 preferably has a height in the range of about 0.5 microns to about 10 microns. Rigid portion 76 is spaced away from the ABS of the transducing head by a distance in the range of about 95 microns to about 150 microns. In further embodiments of the present invention, an electrical stud may not be positioned within the insulating layer and the overcoat. However, the rigid portion of the basecoat may still be positioned between two compliant portions of the basecoat as shown in FIGS. 2A and 2B.

Rigid portion 76 is more rigid than compliant portion 74 of basecoat interface layer 60. Compliant portion 74 of basecoat 60 is generally formed of $SiO_x$ and $SiO_xN_y$, or alternatively may be formed by an air gap. The Young's modulus of the compliant portion material is typically low and is in the range of about 30 GPa to about 90 GPa. Rigid portion 76 of basecoat 60 is generally formed of alumina ($Al_2O_3$), SiC, or a DLC. Rigid portion 76 of basecoat 60 is generally formed of alumina ($Al_2O_3$), SiC, or a DLC. Rigid portion 76 material has a Young's modulus greater than the Young's modulus of compliant portion 74 material, which is typically in the range of about 150 GPa to about 1000 GPa.

The multi-material basecoat reduces thermal protrusion of transducer 18 during operation of transducing head 10. Rigid portion 76 provides a connection between transducer 18 and insulating layer 24 to substrate 14. Insulating layer 24 expands at a slower rate than both substrate 14 and the metallic layers of transducer 18 because insulating layer 24 has a smaller GTE than both substrate 14 and the metallic layers of transducer 18. Rigid portion 76 anchors insulating layer 24, and thereby transducer 18, to substrate 14, thus during operation of transducing head 10, rigid portion 76 pulls transducer 18 away from the ABS via insulating layer 24. Insulating layer 24 shrinks relative to substrate 14 (i.e., insulating layer 24 expands at a slower rate than substrate 14) about center line 82, or center of thermal expansion of rigid portion 76. The force of the expansion of insulating layer 24 relative to substrate 14 pulls the metallic layers of transducer 18 away from the ABS and towards the back surface of transducing head 10. The thermal protrusion is thus reduced relative to thermal protrusion in current transducing heads. FIG. 2B shows transducer 18 where thermal protrusion in current transducing heads. FIG. 2B shows transducer 18 where thermal protrusion is compensated so much by insulating layer 24 that transducer 18 becomes recessed from the ABS with respect to substrate 14. Dependent upon dimensions and properties of head components, transducer 18 may be recessed from the ABS (as shown in FIG. 2B), remain aligned with substrate 14, or protrude slightly from the ABS.

Figure 3A:
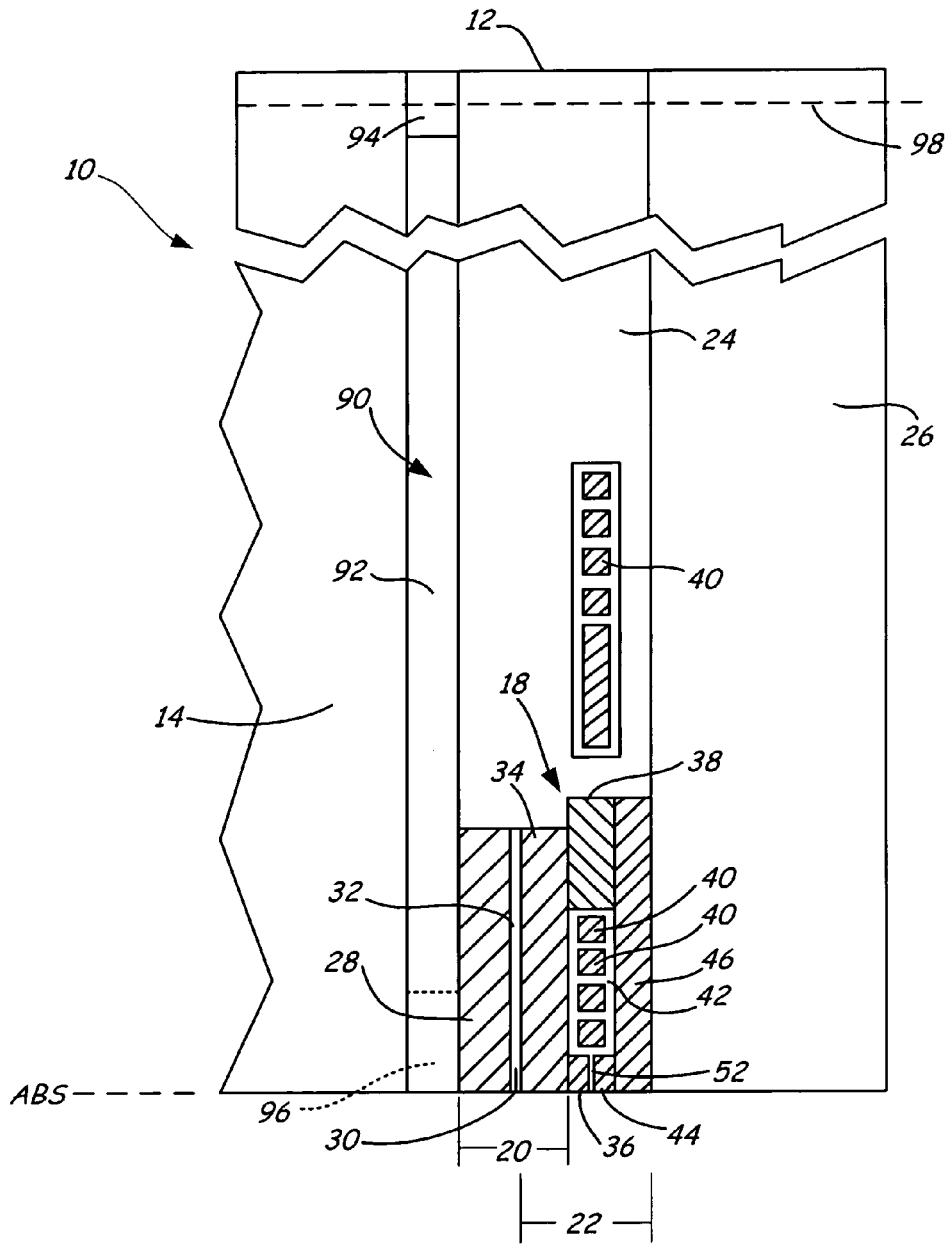
FIG. 3A is a partial cross-sectional view of a further embodiment of a transducing head in accord with the present invention.
Figure 3B:
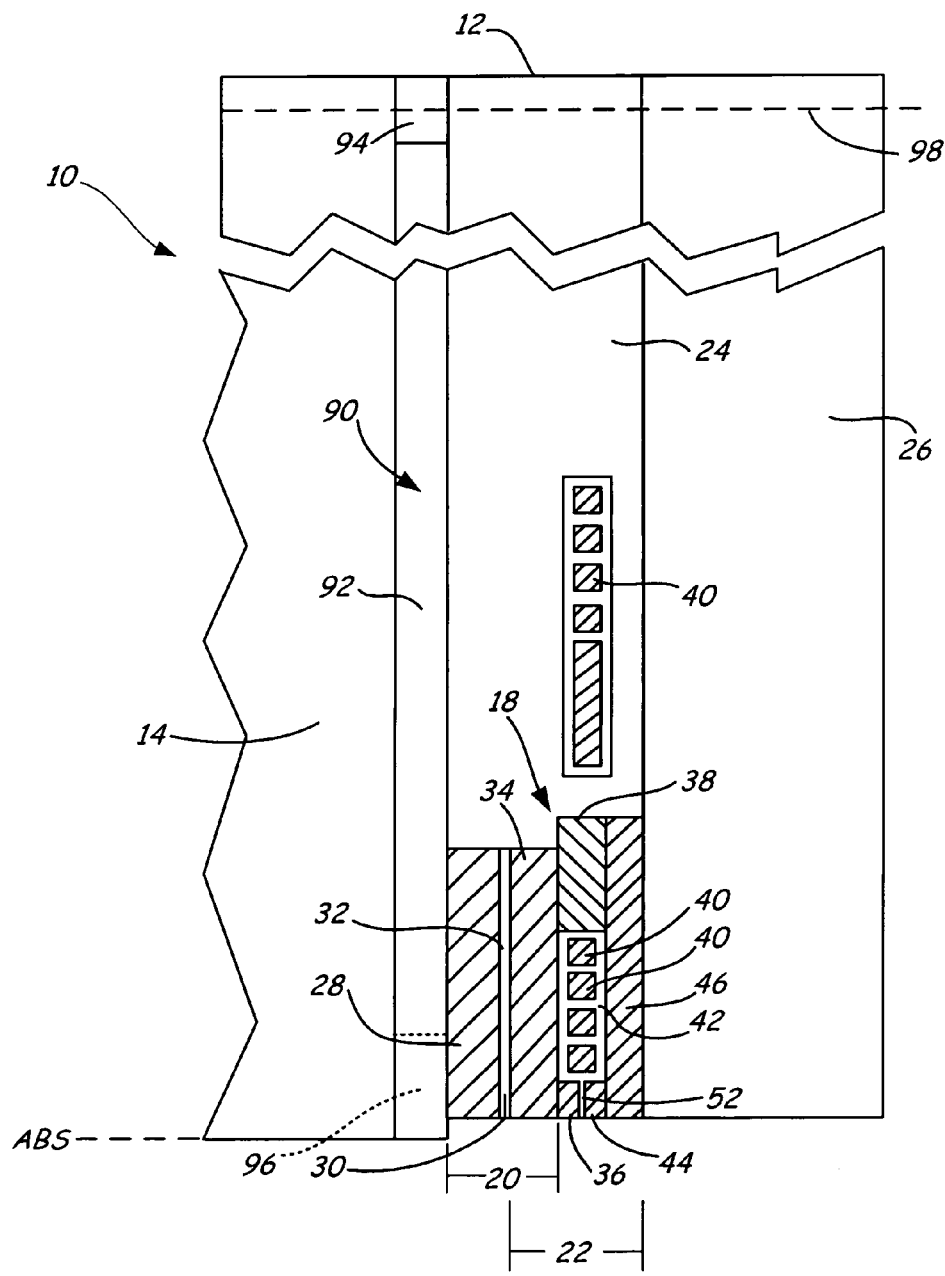
FIG. 3B is a partial cross-sectional view of the transducing head of FIG. 3A showing the effect of an expanding transducing head.

FIG. 3A is a partial cross-sectional view of transducing head 10 in accord with another embodiment of the present invention and FIG. 3B is a partial cross-sectional view of transducing head 10 of FIG. 3A illustrating the expanding transducer 18. The cross-sections are taken substantially normal to the ABS of transducing head 10. Transducing head 10 includes substrate 14, a multi-material basecoat 90, transducer reader 20, transducer writer 22, insulating layer 24, and overcoat 26.

Multi-material basecoat 90 is an interface layer patterned on substrate 14, and includes a compliant portion 92 and a rigid portion 94. Rigid portion 94 is positioned adjacent back surface 12 of transducing head 10 and away from the ABS. Compliant portion 92 is positioned adjacent the ABS and extends to rigid portion 94. Rigid portion 94 has a height in the range of about 0.5 microns to about 5 microns. In further embodiments of the present invention, a second rigid portion 96 (shown in shadow) may be positioned adjacent the ABS or as near to the ABS as possible, with compliant region 92 formed between rigid portions 94 and 96.

Compliant portion 92 of basecoat 90 is generally formed of $SiO_x$ and $SiO_xN_y$, or alternatively may be formed by an air gap. The Young's modulus of the material of compliant portion 92 is typically low and is in the range of about 30 GPa to about 90 GPa. Rigid portion 94 of the basecoat is generally formed of alumina ($Al_2O_3$), SiC, or a DLC. The material of rigid portion 94 has a Young's modulus which is greater than the Young's modulus of compliant portion 92, and is typically in the range of about 150 GPa to about 1000 GPa.

Rigid portion 94 is positioned adjacent back surface 12 of transducing head 10, and adjacent insulating layer 24. Rigid portion 94 anchors insulating layer 24, and thereby transducer 18, to substrate 14. During operation of transducing head 10, insulating layer 24 expands at a slower rate than both substrate 14 and the metallic layers of transducer 18, because insulating layer 24 has a smaller CTE than both substrate 14 and the metallic layers of transducer 18. Insulating layer 24 shrinks relative to substrate 14 (i.e., insulating layer 24 expands at a slower rate than substrate 14) about a center line 98 of rigid portion 94, which defines the center of thermal expansion for the insulating layer 24 and rigid portion 94. The force of the expansion of insulating layer 24 pulls the metallic layers of transducer 18 away from the ABS and towards back surface 12 of transducing head 10. Rigid portion 94 pulls transducer 18 away from the ABS via insulating layer 24 by anchoring the insulating layer 24 to substrate 14. Thus, thermal protrusion of transducer 18 is reduced relative to thermal protrusion in current transducing heads. FIG. 3B shows transducer 18 where thermal protrusion is compensated so much by insulating layer 24 that transducer 18 becomes recessed from the ABS with respect to substrate 14. Dependent upon dimensions and properties of head components, transducer 18 may be recessed from the ABS (as shown in FIG. 3B), remain aligned with substrate 14, or protrude slightly from the ABS.

The present invention includes a multi-material basecoat layer positioned between a substrate and transducer of a transducing head. The basecoat layer reduces thermal protrusion of a transducer. In prior art transducing heads, the basecoat was typically comprised of a single material, which is generally alumina. In the present invention, the basecoat is comprised of at least two materials, the basecoat having a rigid portion and a compliant portion. The rigid portion is generally made of alumina and the compliant portion is made of a material having a Young's modulus less than a Young's modulus of the material of the rigid portion. Typically, the compliant portion is made of $SiO_x$ or $SiO_xN_y$. A basecoat including a rigid portion and a compliant portion redefines the center of thermal expansion for the basecoat, insulating layer and transducer. The center of thermal expansion shifts towards the midpoint of the rigid portion as the difference in Young's modulus between the more rigid and less rigid materials increases. This either allows the transducer to expand in a direction away from the ABS, or anchors the insulating layer such that the force of the expansion of the insulating layer pulls the metallic layers of the transducer away from the ABS. Thus, thermal protrusion of the transducer is reduced. The less rigid the compliant portion is with respect to the rigid portion, the more pronounced the effect of the rigid portion. The present invention multi-material basecoat of the transducing head reduces thermal protrusion when the transducing head is operated at high temperatures, does not increase waviness of the ABS and does not over constrain the materials of the transducing head.

Although the present invention has been described with reference to preferred embodiments, workers skilled in the art will recognize that changes may be made in form and detail without departing from the spirit and scope of the invention.

The invention claimed is:

1. A magnetic head having an air bearing surface comprising:
    a substrate;
    a transducer comprising a plurality of metallic layers; and
    a basecoat comprising at least two materials adjoining the substrate to reduce thermal protrusion of the transducer with respect to the air bearing surface, the basecoat including a compliant portion and a rigid portion positioned in-plane with each other.

2. The magnetic head of claim 1 wherein the rigid portion is positioned adjacent the air bearing surface.

3. The magnetic head of claim 1 wherein the rigid portion is a first rigid portion and a second rigid portion, wherein the second rigid portion is recessed from the first rigid portion.

4. A magnetic head having an air bearing surface and back surface opposite the air bearing surface, the magnetic head comprising:
    a substrate;
    a basecoat adjoining the substrate, the basecoat having a compliant portion and a rigid portion, wherein a Young's modulus of the compliant portion is less than a Young's modulus of the rigid portion, and wherein the compliant portion and the rigid portion are positioned in-plane with each other and adjoining the substrate; and
    a transducer positioned adjacent the basecoat.

5. The magnetic head of claim 4 wherein the rigid portion is positioned adjacent the air bearing surface.

6. The magnetic head of claim 5 wherein the rigid portion is a first rigid portion and a second rigid portion, wherein the second rigid portion is recessed from the first rigid portion.

7. The magnetic head of claim 5 wherein the rigid portion has a height between about 0.5 microns and about 5 microns.

8. The magnetic head of claim 4 wherein the rigid portion is positioned adjacent the back surface.

9. The magnetic head of claim 4 wherein the rigid portion is recessed from the air bearing surface.

10. The magnetic head of claim 4 wherein the Young's modulus of the compliant portion is between about 30 GPa and about 90 GPa.

11. The magnetic head of claim 10 wherein the compliant portion is comprised of $SiO_x$ or $SiO_xN_y$.

12. The magnetic head of claim 4 wherein the compliant portion includes an air gap patterned into the basecoat.

13. The magnetic head of claim 4 wherein the Young's modulus of the rigid portion is between about 150 GPa and about 1000 GPa.

14. The magnetic head of claim 13 wherein the rigid portion comprises at least one of alumina, SiC, or diamond like carbon.

15. A magnetic head having an air bearing surface and a back surface opposite the air bearing surface, the magnetic head comprising:
    a substrate;
    a transducer comprising a plurality of metallic layers;
    an interface layer adjoining the substrate and extending between the air bearing surface and the back surface, the interface layer including a first portion and a second portion more rigid than the first portion, wherein the first portion and the second portion are positioned in-plane with each other; and
    an insulating layer positioned between the transducer and the back surface.

16. The magnetic head of claim 15 wherein the second portion is positioned adjacent the air bearing surface and the transducer.

17. The magnetic head of claim 15 wherein the second portion is positioned adjacent the back surface and the insulating layer.

18. The magnetic head of claim 15 wherein the second portion is recessed from the air bearing surface and is positioned adjacent the insulating layer.

19. The magnetic head of claim 15, and further comprising a stud formed in the insulating layer, the stud having a first edge and a second edge closer to the back surface than the first edge wherein the second portion has a first edge and is recessed from the air bearing surface, and further wherein the first edge of the second portion is closer to the air bearing surface than the first edge of the stud.

20. A magnetic head having an air bearing surface and a back surface opposite the air bearing surface, the magnetic head comprising:
    a substrate;
    a transducer comprising a plurality of metallic layers; and
    a basecoat adjoining the substrate and having a rigid portion and a compliant portion positioned in-plane with each other, wherein the rigid portion of the basecoat anchors the transducer to the substrate.

21. The magnetic head of claim 20 wherein the rigid portion of the basecoat anchoring the transducer to the substrate is positioned adjacent the air bearing surface.

22. The magnetic head of claim 20, and further comprising an insulating layer positioned between the transducer and the back surface.

23. The magnetic head of claim 22 wherein the rigid portion of the basecoat anchoring the transducer to the substrate is positioned adjacent the back surface and the insulating layer.

24. The magnetic head of claim 22 wherein the portion of the basecoat anchoring the transducer to the substrate is recessed from the air bearing surface and positioned adjacent the insulating layer.

* * * * *

UNITED STATES PATENT AND TRADEMARK OFFICE
CERTIFICATE OF CORRECTION

PATENT NO.        : 7,123,447 B2
APPLICATION NO. : 10/462277
DATED             : October 17, 2006
INVENTOR(S)       : John R. Pendray et al.

It is certified that error appears in the above-identified patent and that said Letters Patent is hereby corrected as shown below:

Column 5, Line 46, delete "thenrial", insert --thermal--

Column 7, Line 26, delete "GTE", insert --CTE--

Signed and Sealed this

Twenty-seventh Day of February, 2007

JON W. DUDAS
*Director of the United States Patent and Trademark Office*